(12) United States Patent
Lugovskoy et al.

(10) Patent No.: US 7,121,554 B2
(45) Date of Patent: Oct. 17, 2006

(54) HIGH-PRESSURE SEALING

(75) Inventors: Victor Lugovskoy, Arba (IL); Vladimir Magaziner, Kiryat Ata (IL); Vitaly Chertkov, Arba (IL); Guy Danieli, Jerusalem (IL)

(73) Assignee: MLC Extrusion Systems Ltd., Jerusalem (IL)

( * ) Notice: Subject to any disclaimer, the term of this patent is extended or adjusted under 35 U.S.C. 154(b) by 22 days.

(21) Appl. No.: 10/250,913

(22) PCT Filed: Dec. 27, 2001

(86) PCT No.: PCT/IL01/01206

§ 371 (c)(1),
(2), (4) Date: Dec. 30, 2003

(87) PCT Pub. No.: WO02/055913

PCT Pub. Date: Jul. 18, 2002

(65) Prior Publication Data

US 2004/0084851 A1    May 6, 2004

(51) Int. Cl.
*F16J 15/18*    (2006.01)
*F16J 15/28*    (2006.01)

(52) U.S. Cl. .............. 277/531; 277/532; 277/541; 277/511

(58) Field of Classification Search .......... 277/510, 277/511, 534, 541, 530, 531, 532, 529, 524, 277/533, 342, 452, 453
See application file for complete search history.

(56) References Cited

U.S. PATENT DOCUMENTS

| | | | | |
|---|---|---|---|---|
| 115,463 A * | 5/1871 | Hall et al. | ............... | 277/533 |
| 208,385 A * | 9/1878 | Furse | ............... | 277/533 |
| 396,120 A * | 1/1889 | St. John | ............... | 277/529 |
| 464,935 A * | 12/1891 | Dudoire | ............... | 277/536 |
| 595,675 A * | 12/1897 | Dudley | ............... | 277/531 |
| 643,341 A * | 2/1900 | White et al. | ............... | 277/529 |
| 894,791 A * | 7/1908 | Barnett | ............... | 277/539 |
| 1,079,857 A * | 11/1913 | Huhn | ............... | 277/538 |
| 1,357,919 A * | 11/1920 | O'Sullivan et al. | ............... | 198/707 |
| 1,780,764 A * | 11/1930 | Noble | ............... | 277/510 |
| 1,787,020 A * | 12/1930 | Sautter | ............... | 277/533 |
| 1,844,903 A * | 2/1932 | Queen | ............... | 277/513 |
| 2,673,103 A * | 3/1954 | Tremolada | ............... | 277/515 |
| 3,055,668 A * | 9/1962 | Ragland et al. | ............... | 277/510 |
| 3,076,658 A * | 2/1963 | Leman | ............... | 277/532 |
| 3,300,225 A | 1/1967 | Shepler | | |

(Continued)

*Primary Examiner*—Alison K. Pickard
(74) *Attorney, Agent, or Firm*—Nath & Associates PLLC; Gregory B. Kang; Teresa M. Arroyo

(57) ABSTRACT

In a high-pressure cylinder with an axial plunger, a seal assembly for sealing the gap between the cylinder wall and the plunger. The assembly is disposed in an annual recess in the wall having an open end and a bottom opposite thereto, and comprises a plunger-sealing ring, a cylinder-sealing ring, a resilient low-pressure ring, and an annual seal holder. The seal holder urges the plunger-sealing ring against the cylinder-sealing ring and the low-pressure ring, and urges the latter two rings against the recess bottom and against each other. The plunger-sealing ring and the cylinder-sealing ring are metallic, their mutual contact surfaces are fitted to each other, and the plunger-sealing ring has sufficient section modulus to ensure that under high pressure the contact and bending deformations at the mutual contact surfaces will be sufficiently small as to keep a tight fit therebetween.

10 Claims, 2 Drawing Sheets

U.S. PATENT DOCUMENTS

| | | |
|---|---|---|
| 3,606,356 A | 9/1971 | Beroset |
| 3,801,112 A * | 4/1974 | Dumazet .................... 277/529 |
| 3,865,387 A | 2/1975 | Larker et al. |
| 4,602,791 A | 7/1986 | Zöllner |
| 4,787,642 A | 11/1988 | Etheridge |
| 4,809,993 A | 3/1989 | Henshaw |

* cited by examiner

HIGH-PRESSURE SEALING

FIELD OF THE INVENTION

This invention generally relates to methods of sealing a plunger moveable in a cylinder, and more particularly, in a high-pressure hydraulic cylinder.

BACKGROUND OF THE INVENTION

Pressing and extrusion under very high hydrostatic pressure is an efficient method of processing metals and other materials. Hydraulic presses and cylinders of ever growing power are introduced in metal working and other industries. High-pressure devices need seas capable to work under a wide range of pressures, from atmospheric pressure to extremely high pressures of 20–40 Kbar and more, at which the internal diameter of the high-pressure cylinder expands by ~1% and more.

A hydraulic cylinder has a cylinder wall with an open end wherein a plunger enters the cylinder to compress a hydraulic liquid to high pressure levels. A seal assembly is disposed in an annular recess in the cylinder wall near the open end. Usually, a high-pressure seal assembly comprises a high-pressure seal subassembly and a low-pressure seal subassembly. With regard to expressions "high-pressure" and "low-pressure", it will be understood by those skilled in the art that a single pressure value cannot be specified as a border line between the two. What is meant here and further in the disclosure is, that from zero or atmospheric pressure up to some intermediate pressure range, the sealing of the cylinder is provided solely by elements of the so-called "low-pressure subassembly". At pressures higher than said intermediate pressure range and up to the maximal design pressure, the sealing of the cylinder is provided by the elements of the so-called "high-pressure subassembly" only. In the intermediate pressure range, both subassemblies cooperate to provide sealing. Some elements of the sealing assembly may belong to both subassemblies.

Existing high-pressure seal assemblies usually include elements made of resilient material which, when interacting with the plunger and other metal parts, are subjected to rapid wear. Sometimes, parts of a seal assembly may require to be changed after each pressing cycle.

U.S. Pat. No. 3,606,356 to Beroset presents a high-pressure seal assembly disposed in a recess of a high-pressure cylinder wall. The low-pressure subassembly of U.S. Pat. No. 3,606,356 includes an annular Teflon ring with rectangular profile fitted on the plunger and placed in the recess, an annular Teflon ring with triangular profile embracing the rectangular ring and fitted to the recess outer wall, and a rubber O-ring inserted like a wedge between the two Teflon rings. The high-pressure subassembly includes a metallic antiextrusion ring with triangular profile spanning the recess radially, fitted on the plunger, and abutting the two Teflon rings from the open-end side of the recess. The seal assembly is closed by a retaining ring (seal holder) engaged in a screw-thread at the open end of the cylinder and biasing the antiextrusion ring against the two Teflon rings, thereby urging the rectangular ring and the O-ring against the bottom of the recess. At low pressures, the cylinder is sealed by the two Teflon rings and the O-ring between them. At high pressures, the rectangular Teflon ring and the O-ring cease to operate but the triangular Teflon ring expands under the action of the pressure together with the cylinder wall, and the sealing is provided by the metallic antiextrusion ring in cooperation with the triangular ring. Thus, the triangular Teflon ring actually belongs to the high-pressure subassembly as well.

U.S. Pat. No. 3,865,387 discloses high-pressure seal assemblies including two metal rings disposed in a recess of the cylinder wall similar to that described above. In one embodiment, a metallic "plunger-sealing" ring with triangular profile is fitted to the plunger and sealingly abuts a seal holder fixed over the open end of the recess. A metallic "cylinder-sealing" ring of generally rectangular profile is fitted inside the recess of the cylinder wall, embracing the first ring, and also sealingly abutting the seal holder. The cylinder-sealing ring has an internal skewed recess or bevel at the recess open-end side, accommodating part of the plunger-sealing ring, the two rings defining a narrow conical slit therebetween. The cylinder-sealing ring has two more annular pocket-like recesses, each accommodating a rubber O-ring. One recess is at the beveled internal side opposite the edge of the plunger-sealing ring, and its O-ring is urged to the plunger-sealing ring, to the cylinder-sealing ring, and to the plunger. The other recess is at the outer periphery of the cylinder-sealing ring and its O-ring is urged to the cylinder wall. Low-pressure sealing is provided by the O-rings only. High-pressure sealing is provided by the two metallic rings with the cooperation of the O-ring that is between them.

A second embodiment of the U.S. Pat. No. 3,865,387 has a similar arrangement but the cylinder-sealing ring is beveled also at the recess bottom side. An annular groove is formed between the two metallic rings, accommodating an enlarged O-ring which is urged to both metallic rings, to the plunger and to the cylinder wall. Low-pressure sealing is provided by the O-ring. High-pressure sealing is provided by the two metallic rings with the cooperation of the O-ring.

There are other high-pressure seal designs, where the operation of the high-pressure subassembly does not involve rapid wear of the low-pressure subassembly, but then the high-pressure subassembly experiences too large elastic deformations leading to rapid wear.

Thus, U.S. Pat. No. 4,602,791 discloses a high-pressure seal assembly, where the high-pressure subassembly comprises a plurality of elastic metallic rings with chevron profile (V-profile). The rings are stacked in a recess of the cylinder wall, embracing the plunger, abutting the plunger and the cylinder wall, with the V-profile open towards the high-pressure side of the cylinder. Under the action of the high pressure, the V-profile opens elastically, following the expansion of the cylinder, and seals the gap around the plunger.

U.S. Pat. No. 4,787,642 discloses an arrangement, wherein an X-profile high-pressure metallic ring is disposed in a recess of the cylinder wall. Two deformable rings with triangular profiles are fitted in the lateral spaces of the X-profile, at the plunger and at the cylinder, respectively, constituting the low-pressure subassembly. Two metallic rings with wedge profiles are inserted in the upper and the lower spaces of the X-profile. The operation of this sealing assembly at high pressure is the same as the previous one, the X-profile effectively working as two opposite V-profiles.

SUMMARY OF THE INVENTION

In accordance with the present invention, it is provided a high-pressure seal assembly, where the high-pressure sealing is achieved by metallic rings only.

The seal assembly of the present invention seals the gap between the cylindrical wall of a high-pressure cylinder and an axially moveable plunger. The seal assembly is placed in an annular internal recess in the wall bounded radially by the cylinder wall, and axially by an open end and a bottom opposite thereto, and comprises a plunger-sealing ring, a cylinder-sealing ring, a resilient low-pressure ring, and an annular seal holder. The low-pressure ring is fitted on the plunger and is disposed at the recess bottom, the cylinder sealing ring is disposed in the recess around the resilient ring, and is tightly fitted against the cylinder wall, the plunger-sealing ring is tightly fitted on the plunger and is disposed in the recess extending radially along the cylinder sealing ring and the low-pressure ring, the seal holder is inserted into the open end of the recess, abuts the plunger-sealing ring, and is tightened to the cylinder wall urging the plunger-sealing ring against the cylinder-sealing ring and the low-pressure ring, and urging the latter two rings against the recess bottom and against each other. Both the plunger-sealing ring and the cylinder-sealing ring are metallic, their mutual contact surfaces are fitted to each other, preferably by lapping, and the plunger-sealing ring has sufficient section modulus to ensure that under high pressure the contact and bending deformations at the mutual contact surfaces be sufficiently small as to keep a tight fit therebetween.

According to the design of the present invention, the metallic rings of the high-pressure subassembly are not subjected to significant bending deformations, and the resilient ring of the low-pressure subassembly does not wear excessively under high pressure, thereby allowing for longer operational life and efficiency of the seal assembly and operability at much higher pressures than the prior art seals.

BRIEF DESCRIPTION OF THE DRAWINGS

In order to understand the invention and to see how it may be carried out in practice, two embodiments will now be described, by way of non-limiting example only, with reference to the accompanying drawings, in which.

DETAILED DESCRIPTION OF THE INVENTION

Figure 1:
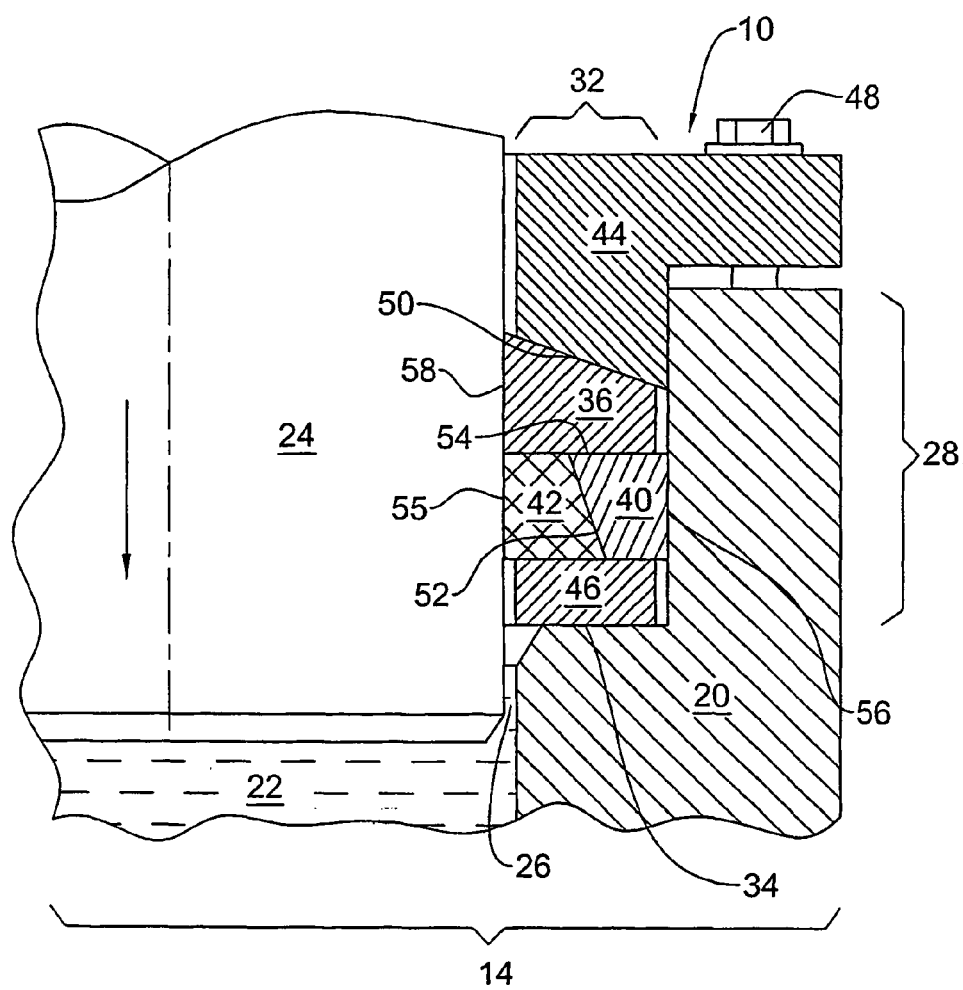
FIG. 1 is a cross-section along the axis of a high-pressure seal assembly in accordance with the present invention.

With reference to FIG. 1, it is shown a high-pressure seal assembly 10 in accordance with the present invention, in a high-pressure cylinder 14 with wall 20, hydraulic working liquid 22 and plunger 24 axially moveable into the cylinder to compress the working liquid. The seal assembly is designed to seal the gap 26 between the wall 20 and the plunger 24, and is disposed in an annular internal recess 28 in the wall 20, the recess being bounded radially by the cylinder wall and axially by an open end 32 and a bottom 34 opposite thereto. The seal assembly comprises a metallic plunger-sealing ring 36, a metallic cylinder-sealing ring 40, a resilient low-pressure ring 42, an annular seal holder 44, and a supporting ring 46. The supporting ring 46 is disposed at the recess bottom 34. It has no sealing function and can be regarded as part of the bottom 34 in the cylinder wall 20.

The seal holder 44 is tightened axially by suitable means 48 to the cylinder wall 20, thereby urging elements 36, 40, 42, and 46 of the seal assembly 10 towards the recess bottom 34. The contact surfaces 50 of the seal holder 44 and the plunger-sealing ring 36 have frusto-conical shape tapered towards the open end 32, the mutual contact surfaces 52 of the cylinder-sealing ring 40 and the low-pressure ring 42 have also frusto-conical shape tapered towards the open end, while the contact surfaces 54 between the metallic rings 36 and 40 are flat and perpendicular to the cylinder axis.

The resilient low-pressure ring 42 is tightly fitted on the plunger 24, along contact surfaces 55. The cylinder-sealing ring 40 embraces the low-pressure ring 42 and is tightly fitted against the cylinder wall 20 along contact surfaces 56. In free state, the low-pressure ring 42 has larger axial dimension than the ring 40, so that when the seal is assembled, the ring 42 is elastically deformed under the urging force of the seal holder 44, and thereby tightly fitted also to the cylinder-sealing ring 40 along the contact surface 52. The plunger-sealing ring 36 is tightly fitted on the plunger along a contact surface 58. The mutual contact surfaces of metallic rings 36 and 40 are fitted very precisely to each other by lapping.

When the plunger 24 starts to move into the cylinder 14, the pressure in the hydraulic fluid 22 starts to rise from zero (or atmospheric) pressure. Up to some range of intermediate pressure values, the sealing of the cylinder is provided by the tight fit of the low-pressure ring 42 to the plunger 24 along the contact surface 55, to the cylinder-sealing ring 40 along the contact surface 52, and by the tight fit of the ring 40 to the cylinder wall 20 along the contact surface 56. Thus, the rings 40 and 42 constitute a low-pressure subassembly.

Figure 2:
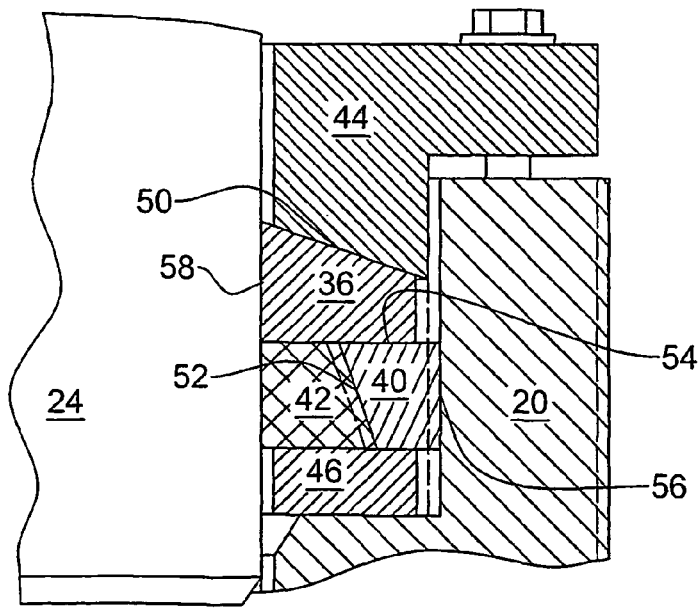
FIG. 2 is a cross-section of the seal assembly of FIG. 2 with deformations under high pressure shown schematically exaggerated.

As the plunger 24 moves further into the cylinder 14, the hydraulic fluid pressure becomes higher and the cylinder experiences considerable elastic expansion, as shown in exaggerated form in FIG. 2. The high pressure exerted thereby on the resilient low-pressure ring 42 is transmitted to the cylinder-sealing ring 40 across the inclined contact surface 52 as an outward radial force which expands the ring 40 together with the cylinder wall 20, thereby keeping the tight fit on the contact surface 56. The high pressure also urges the cylinder-sealing ring 40 to the plunger-sealing ring 36, making their fit along the precisely lapped surfaces 54 fluid-tight. The axially directed pressure exerted by the cylinder-sealing ring 40 on the plunger-sealing ring 36 is transformed, via of the inclined contact surfaces 50, into an inward radial force which tightens the fit of the plunger-sealing ring 36 on the plunger 24.

At pressures higher than the intermediate range and up to maximal design pressures, the sealing is provided only by the metallic rings 40 and 36, across the contact surfaces 54, 56, and 58. Thus, the plunger-sealing ring 36 and the cylinder-sealing ring 40 constitute a high-pressure subassembly.

With the design of the present invention, the high pressure of the hydraulic liquid helps to tighten the fits that provide for the sealing effectiveness of the assembly. However, to achieve this tightening effect, the profiles of the metallic rings 36 and 40 must have sufficient section moduli of resistance to ensure that, under high pressure, contact and bending deformations at the mutual contact surface be sufficiently small. This is especially important for the plunger-sealing ring 36 which spans the width of both rings 40 and 42, and is not precisely fitted to the seal holder 44 along the contact surface 50. As seen in FIGS. 1 and 2, sufficient rigidity of the ring 36 is ensured by its relatively thick profile, preferably with mean axial dimension at least equal to half radial dimension.

Figure 3:
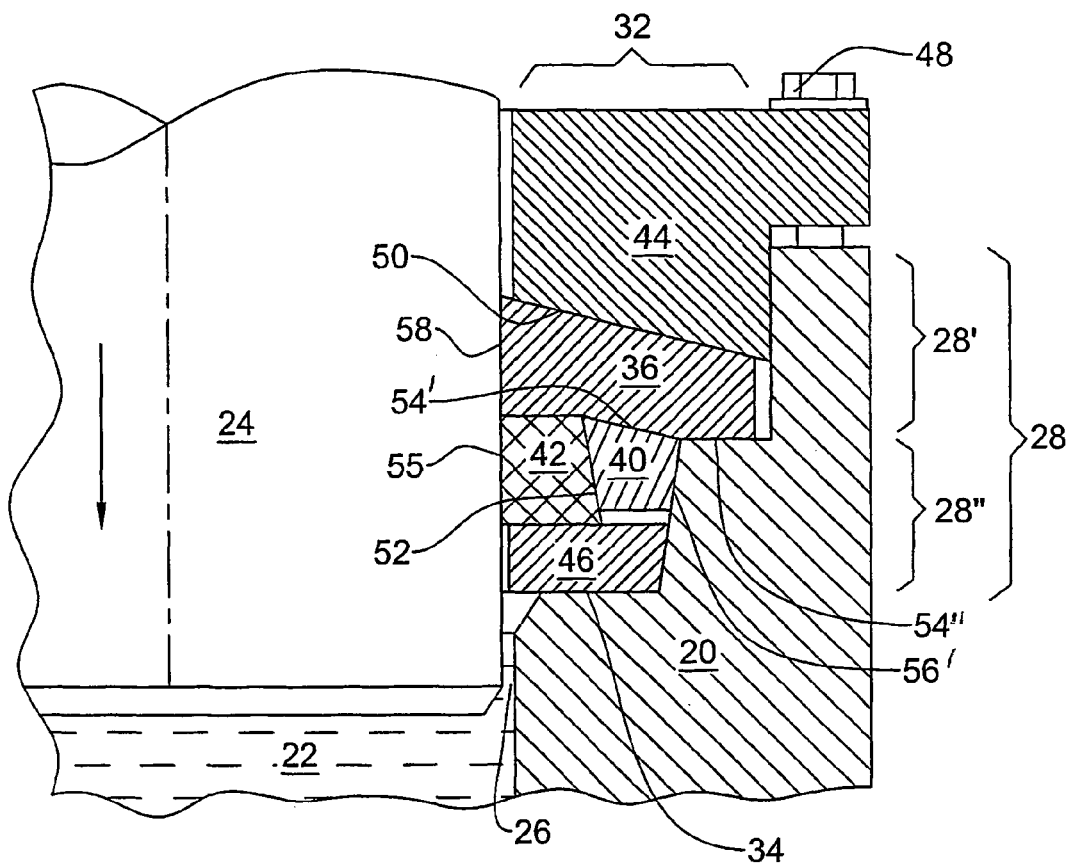
FIG. 3 is a cross-section along the axis of a high-pressure seal assembly in accordance with a second embodiment of the present invention.

A second embodiment of a high-pressure seal assembly in accordance with the present invention is shown in FIG. 3. The similar elements of the assembly are designated by the same reference numerals as in FIGS. 1 and 2, the difference being that the recess 28 consists of two steps, the first step 28', adjacent the open end 32, being of a greater diameter than the second step 28". A shoulder 54' is formed between the two steps. The second step 28" is tapered towards the recess bottom 34, and correspondingly, the cylinder-sealing ring 40 is fitted to the cylinder wall along frusto-conical contact surfaces 56. The plunger-sealing ring now rests on the shoulder 54'. Also, the contact surfaces 54 between the plunger-sealing ring 36 and the cylinder-sealing ring 40 are not flat and perpendicular to the common axis, but frusto-conical, with taper towards the open end 32.

Figure 4:
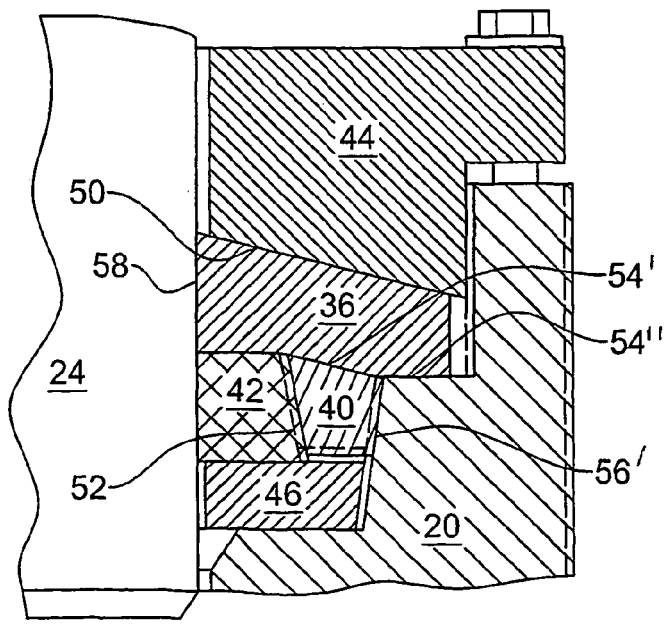
FIG. 4 is a cross-section of the seal assembly of FIG. 3 with deformations under high pressure shown schematically exaggerated.

The sealing operation of the second embodiment in the low-pressure range is the same as in the first embodiment. However, as shown in FIG. 4, under a high pressure the sealing action is enhanced. When the cylinder wall 20 expands due to the high pressure, the cylinder-sealing ring 40 expands under the radial force exerted by the high pressure on the surface 52. The ring 40 expands radially and slides along the precisely lapped contact surface 54 relative to the plunger-sealing ring 36. But due to the inclination of the surface 54, the ring 40 is pushed towards the recess bottom 34, thereby increasing the tightness of the fit along the inclined contact surface 56. Also, since the ring 36 spans the rings 42 and 40 with an excess that rests on the shoulder 54', the profile of the ring 40 does not overhang the edge of the ring 36 under high pressure, as is the case with the first embodiment (compare FIG. 2 and FIG. 4). This overhang, at extremely high pressures, leads to extrusion of the material of the cylinder-sealing ring into the gap between the plunger-sealing ring 36 and the cylinder wall 20 even though the ring is made of metal, and consequently to more rapid wear of the seal.

While there have been disclosed two preferred embodiments of the invention, it is to be understood that changes may be made therein without departing from the spirit of the invention. For example, the recess in the high-pressure cylinder wall may be formed by inserting a changeable liner into the cylinder. Also, the metallic high-pressure sealing rings may be composed of two or more rings each.

The invention claimed is:

1. In a high-pressure cylinder with a wall, adapted to receive therein an axially moveable plunger, a seal assembly for sealing the gap between said wall and said plunger, comprising an annular internal recess in said wall, the recess being bounded radially by the cylinder wall and axially by an open end and a bottom opposite thereto, a plunger-sealing ring, a cylinder-sealing ring, a resilient low-pressure ring, and an annular seal holder, wherein
 the resilient low-pressure ring is fitted on the plunger and is disposed at the recess bottom;
 the cylinder sealing ring is disposed in the recess around the low-pressure ring, and is tightly fitted against the cylinder wall;
 the plunger sealing ring is tightly fitted on the plunger and is disposed in the recess, extending radially along the cylinder sealing ring and the low-pressure ring;
 the seal holder is inserted into the open end of the recess, abutting the plunger-sealing ring, and being tightened to the cylinder wall to urge the plunger-sealing ring against the cylinder-sealing ring and the low-pressure ring, and to urge the latter two rings against the recess bottom and against each other;
 both the plunger sealing-ring and the cylinder-sealing ring being metallic, their mutual contact surfaces being fitted to each other, the plunger sealing ring having sufficient section modulus to ensure that under high pressure the contact and bending deformations at said mutual contact surfaces be sufficiently small as to keep a tight fit therebetween,
 wherein high-pressure sealing of the gap between the plunger and the cylinder wall is provided entirely by said two metallic rings across the following interfaces: between the plunger and the plunger-sealing ring; between the plunger-sealing ring and the cylinder-sealing ring; and between the cylinder-sealing ring and the cylinder wall.

2. A seal assembly according to claim 1, wherein low-pressure sealing of said gap between the plunger and the cylinder wall is provided by said resilient low-pressure ring and said cylinder-sealing ring across the following interfaces: between the plunger and the resilient ring; between the resilient ring and the cylinder-sealing ring; and between the cylinder-sealing ring and the cylinder wall.

3. A seal assembly according to claim 2, wherein said interface between the resilient ring and the cylinder-sealing ring is a frusto-conical surface coaxial with the cylinder and the plunger, and tapered towards the open end of the recess.

4. In a high-pressure cylinder with a wall, adapted to receive therein an axially moveable plunger, a seal assembly for sealing the gap between said wall and said plunger, comprising an annular internal recess in said wall, the recess being bounded radially by the cylinder wall and axially by an open end and a bottom opposite thereto, a plunger-sealing ring, a cylinder-sealing ring, a resilient low-pressure ring, and an annular seal holder, wherein
 the resilient low-pressure ring is fitted on the plunger and is disposed at the recess bottom;
 the cylinder sealing ring is disposed in the recess around the low-pressure ring, and is tightly fitted against the cylinder wall;
 the plunger sealing ring is tightly fitted on the plunger and is disposed in the recess, extending radially along the cylinder sealing ring and the low-pressure ring;
 the seal holder is inserted into the open end of the recess, abutting the plunger-sealing ring, and being tightened to the cylinder wall to urge the plunger-sealing ring against the cylinder-sealing ring and the low-pressure ring, and to urge the latter two rings against the recess bottom and against each other;
 both the plunger sealing-ring and the cylinder-sealing ring being metallic, their mutual contact surfaces being fitted to each other, the plunger sealing ring having sufficient section modulus to ensure that under high pressure the contact and bending deformations at said mutual contact surfaces be sufficiently small as to keep a tight fit therebetween,
 wherein the plunger-sealing ring abuts the seal holder along a common frusto-conical surface coaxial with the cylinder and the plunger, and tapered towards the open end of the recess.

5. A seal assembly according to claim 4, wherein said mutual contact surface of the plunger-sealing ring and the cylinder-sealing ring is an annular surface perpendicular to the cylinder axis.

6. A seal assembly according to claim 4, wherein at least one of said metallic rings is made of bronze.

7. A seal assembly according to claim 4, wherein at least one of said metallic rings is made of steel.

8. In a high-pressure cylinder with a wall, adapted to receive therein an axially moveable plunger, a seal assembly for sealing the gap between said wall and said plunger, comprising an annular internal recess in said wall, the recess being bounded radially by the cylinder wall and axially by an open end and a bottom opposite thereto, a plunger-sealing ring, a cylinder-sealing ring, a resilient low-pressure ring, and an annular seal holder, wherein the resilient low-pressure ring is fitted on the plunger and is disposed at the recess bottom;

the cylinder sealing ring is disposed in the recess around the low-pressure ring, and is tightly fitted against the cylinder wall;

the plunger sealing ring is tightly fitted on the plunger and is disposed in the recess, extending radially along the cylinder sealing ring and the low-pressure ring;

the seal holder is inserted into the open end of the recess, abutting the plunger-sealing ring, and being tightened to the cylinder wall to urge the plunger-sealing ring against the cylinder-sealing ring and the low-pressure ring, and to urge the latter two rings against the recess bottom and against each other;

both the plunger sealing-ring and the cylinder-sealing ring being metallic, their mutual contact surfaces being fitted to each other, the plunger sealing ring having sufficient section modulus to ensure that under high pressure the contact and bending deformations at said mutual contact surfaces be sufficiently small as to keep a tight fit therebetween, wherein said mutual contact surface of the plunger-sealing ring and the cylinder-sealing ring is a frusto-conical surface coaxial with the cylinder and the plunger, and tapered towards the open end of the recess.

9. A seal assembly according to claim 8, wherein the cylinder-sealing ring is fitted to the cylinder wall along a common frusto-conical surface coaxial with the cylinder and the plunger, and tapered towards the bottom of the recess.

10. A seal assembly according to claim 9, wherein the recess in the cylinder wall comprises two steps, the one adjacent the open end being of larger diameter and accommodating the periphery of the plunger-sealing ring, and the seal holder.

* * * * *

UNITED STATES PATENT AND TRADEMARK OFFICE
CERTIFICATE OF CORRECTION

PATENT NO. : 7,121,554 B2  Page 1 of 1
APPLICATION NO. : 10/250913
DATED : October 17, 2006
INVENTOR(S) : Lugovskoy et al.

It is certified that error appears in the above-identified patent and that said Letters Patent is hereby corrected as shown below:

Front Cover, item (75), please delete
"Arba" and
replace with -- Kiryat Arba --

Signed and Sealed this

Twelfth Day of June, 2007

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,121,554 B2 |
| APPLICATION NO. | : 10/250913 |
| DATED | : October 17, 2006 |
| INVENTOR(S) | : Lugovskoy et al. |

Page 1 of 1

It is certified that error appears in the above-identified patent and that said Letters Patent is hereby corrected as shown below:

On the Title Page, <u>Please insert:</u>

Item -- (30) Priority Data:
     140828   9 January 2001   (09.01.2001)   IL --

Signed and Sealed this

Tenth Day of February, 2009

JOHN DOLL
*Acting Director of the United States Patent and Trademark Office*